＃US010058932B2

(12) United States Patent
Kopton

(10) Patent No.: US 10,058,932 B2
(45) Date of Patent: Aug. 28, 2018

(54) FACE MILLING TOOL

(71) Applicant: AUDI AG, Ingolstadt (DE)

(72) Inventor: Peter Kopton, Kösching (DE)

(73) Assignee: Audi AG, Ingolstadt (DE)

( * ) Notice: Subject to any disclaimer, the term of this patent is extended or adjusted under 35 U.S.C. 154(b) by 323 days.

(21) Appl. No.: 14/916,805

(22) PCT Filed: Jul. 19, 2014

(86) PCT No.: PCT/EP2014/001970
§ 371 (c)(1),
(2) Date: Mar. 4, 2016

(87) PCT Pub. No.: WO2015/032459
PCT Pub. Date: Mar. 12, 2015

(65) Prior Publication Data
US 2016/0193670 A1 Jul. 7, 2016

(30) Foreign Application Priority Data

Sep. 5, 2013 (DE) .................. 10 2013 014 761

(51) Int. Cl.
B23C 5/20 (2006.01)
B23C 5/22 (2006.01)
B23C 5/06 (2006.01)

(52) U.S. Cl.
CPC .......... B23C 5/06 (2013.01); B23C 2210/285 (2013.01); B23C 2220/48 (2013.01); B23C 2220/605 (2013.01)

(58) Field of Classification Search
CPC ........ B23C 2210/285; B23C 2220/605; B23C 5/06; B23C 2220/48
See application file for complete search history.

(56) References Cited

U.S. PATENT DOCUMENTS 2,586,955 A * 2/1952 Kaiser .................... B23C 5/242
407/38
3,163,919 A 1/1965 Turner
(Continued)

FOREIGN PATENT DOCUMENTS

CN 101125376 2/2008
CN 101628347 1/2010
(Continued)

OTHER PUBLICATIONS

Chinese Search Report dated Oct. 24, 2016 with respect to counterpart Chinese patent application 201480048825.9.
(Continued)

Primary Examiner — Sara Addisu
(74) Attorney, Agent, or Firm — Henry M. Feiereisen LLC

(57) ABSTRACT

A milling tool for face milling a substantially flat workpiece surface includes at least one main cutting element rotatable in a rotation direction about a tool axis oriented at a right angle to the workpiece surface and movable transversely to the tool axis and along the workpiece surface. The main cutting element includes a face cutter having a radially outer cutting edge corner and adapted to remove material from the workpiece surface up to maximal a nominal size. At least one clearance groove cutting element is provided and leads the main cutting element in the rotation direction to produce in the workpiece surface a clearance groove, in which the radially outer cutting edge corner of the main cutting element is guided substantially without being subjected to cutting stress.

12 Claims, 5 Drawing Sheets

(56) References Cited

U.S. PATENT DOCUMENTS

| | | | | |
|---|---|---|---|---|
| RE26,637 E | * | 7/1969 | Vaughn | B23C 5/2208 15/93.1 |
| 3,759,625 A | * | 9/1973 | Iversen | B23C 5/241 407/104 |
| 4,586,855 A | * | 5/1986 | Rawle | B23C 5/06 407/38 |
| 4,789,273 A | * | 12/1988 | Wiacek | B23C 5/2213 407/34 |
| 4,808,044 A | | 2/1989 | Tsujimura | |
| 4,936,718 A | * | 6/1990 | Proffitt | B23C 5/22 407/36 |
| 8,226,334 B2 | * | 7/2012 | Hanks | B23C 5/10 407/59 |
| 8,277,151 B2 | * | 10/2012 | Wandeback | B23C 5/06 407/113 |
| 8,327,742 B1 | * | 12/2012 | Austin | B23C 5/2472 407/37 |
| 8,979,447 B2 | * | 3/2015 | Bozkurt | B23C 5/06 407/113 |
| 9,849,521 B2 | * | 12/2017 | Morandeau | B23C 5/06 |
| 2002/0172567 A1 | | 11/2002 | Popke | |
| 2008/0273931 A1 | * | 11/2008 | Spitzenberger | B23C 5/202 407/51 |
| 2012/0093594 A1 | | 4/2012 | Kirchberger | |

FOREIGN PATENT DOCUMENTS

| | | |
|---|---|---|
| CN | 102470456 | 5/2012 |
| DE | 159407 | 9/1983 |
| DE | 3714533 A1 | 5/1987 |
| DE | 261984 A1 | 11/1988 |
| DE | 19516946 A1 | 11/1996 |
| DE | 10124234 A1 | 11/2002 |
| DE | 10344 549 B3 | 3/2005 |
| DE | 10344549 B3 | 3/2005 |
| FR | 2894497 A3 | 6/2007 |
| JP | S6085816 A | 5/1985 |
| JP | 2008023632 | 2/2008 |
| KR | 20030026573 | 4/2003 |
| WO | WO2011/003120 A1 | 1/2011 |

OTHER PUBLICATIONS

Translation of Chinese Search Report dated Oct. 24, 2016 with respect to counterpart Chinese patent application 201480048825.9.
International Search Report issued by the European Patent Office in International Application PCT/EP2014/001970.

* cited by examiner

FACE MILLING TOOL

CROSS-REFERENCES TO RELATED APPLICATIONS

This application is the U.S. National Stage of International Application No. PCT/EP2014/001970, filed Jul. 19, 2014, which designated the United States and has been published as International Publication No. WO 20151032459 and which claims the priority of German Patent Application, Serial No. 10 2013 014 761.1, filed Sep. 5, 2013, pursuant to 35 U.S.C. 119(a)-(d).

BACKGROUND OF THE INVENTION

The invention relates to a milling cutting element for face milling of a workpiece surface, and to a method for face milling.

The production of flat workpiece surfaces is realized with the so-called face milling, which can be divided into a peripheral face milling and in a peripheral face plain milling. When peripheral face milling (hobbing) is involved, the tool axis is parallel to the workpiece surface. The milling tool operates only with its peripheral cutters.

When peripheral face plain milling is involved, however, the tool axis is perpendicular to the workpiece surface. The cutters of the milling tool are divided into peripheral cutters and face cutters. The peripheral cutters remove the surface material in a feed motion transversely to the tool axis, while the face cutters of the milling tool smoothly scrape the machined workpiece surface.

DE 195 16 946 A1 discloses a generic tool which can be used for face milling a substantially flat workpiece surface. During milling operation, the milling tool can be operated with a rotary movement about a tool axis at a right angle to the workpiece surface and with a feed movement transversely to the tool axis and along the workpiece surface. The milling tool has main cutting elements on an end face, with the face cutter thereof removing the surface-side workpiece material to a nominal size.

In this milling operation, distinction is made between clearance angle, wedge angle, and rake angle of the cutting elements. The magnitude of these angles depends on the respective tool/workpiece combination. The clearance angle in particular of peripheral cutters limits in terms of production the relevant feed rate of the end mill. When increasing the clearance angle, the feed rate can be increased. However, the increase of the clearance angle is accompanied by a corresponding reduction of the wedge angle of the peripheral cutter, so that there is the risk of tool breakage or at least of premature wear.

SUMMARY OF THE INVENTION

The object of the invention is the provision of a milling tool and a method for face milling substantially flat workpiece surfaces to enable implementation of greater rates of feed compared to the art.

According to one aspect of the invention, the object is attained by a milling tool for face milling a substantially flat workpiece surface, with a rotation movement about a tool axis at a right angle to the workpiece surface and with a feed movement transversely to the tool axis and along the workpiece surface, which milling tool comprising at least one main cutting element having a face cutter which extends up to a radially outer cutting edge corner and removes material up to maximal a nominal size, wherein the milling tool includes at least one clearance groove cutting element which in particular leads the main cutting element in the rotation direction and generates in the workpiece surface a clearance groove, in which the radially outer cutting edge corner of the main cutting element is guided substantially without being subjected to cutting stress.

According to another aspect of the invention, the object is attained by a method for face milling a substantially flat workpiece surface, wherein the milling tool operates with a rotation movement about a tool axis at a right angle to the workpiece surface and with a feed movement transversely to the tool axis and along the workpiece surface, in which method the surface material is removed by at least one face cutter of the tool and a clearance groove is produced with the assistance of a clearance groove cutting element, which leads in the rotation direction, for guiding therein a radially outer cutting edge corner of the face cutter substantially without being subjected to cutting stress.

Preferred refinements of the invention are disclosed in the dependent claims.

The invention is based on the fact that in known face milling processes an increase in the feed rate is always limited by a maximum admissible clearance angle of the peripheral cutters of the milling tool in order to minimize the risk of tool breakage or premature tool wear. Against this background, the milling tool according to the characterizing part of patent claim 1 has at least one clearance groove cutting element which leads the main cutting element. With the assistance of the clearance groove cutting element, a clearance groove is generated in the workpiece surface, which leads the main cutting element. The radially outer cutting edge corner of the main cutting element is guided in this clearance groove, substantially without being subjected to cutting stress. According to the invention, the end cutter of the main cutting element does no longer transition into a peripheral cutter whose clearance angle is critical in terms of premature wear or tool breakage. Rather, the radially outer cutting edge corner of the face cutter is distanced by a clearance from the radially outer groove sidewall of the clearance groove. Thus, the need for configuring a peripheral cutter with corresponding clearance angle is eliminated and instead the provision of the clearance groove is envisioned.

To produce the clearance groove, provision is made for a special clearance groove cutting element which leads the main cutting element. The clearance groove cutting element also has a face cutter which transitions at radially inner and outer cutting edge corners into radially inner and outer peripheral cutters, respectively. With the assistance of the face cutter and the two peripheral cutters, the clearance groove cutting element is able to produce the groove base and the two groove sidewalls of clearance groove. To minimize cutting stress on the clearance groove cutting element, the groove width of the produced clearance groove is greatly reduced, for example, to 2 to 3 mm.

Moreover, it is preferred when the main cutting element trailing in the rotation direction extends radially inwards beyond or overlaps the clearance groove cutting element by a predefined overhang. As a result, after production of the clearance groove, a, still non-machined material web, which remains radially inside on the workpiece surface, can be stripped by the trailing main cutting element to the nominal size.

Both the face cutter of the main cutting element and the face cutter of the clearance groove cutting element are at an incline about a rake angle in opposition to the rotation direction. In addition, the respective face cutter spans each a clearance angle with the machined workpiece surface.

The at least one main cutting element and the clearance groove cutting element together form a cutter set. At least one such cutter set is provided on the end face of the milling tool, preferably however several cutter sets, which are arranged evenly distributed circumferentially on the milling tool.

According to one embodiment, the cutter set may have not only a single main cutting element, but rather, as viewed in the rotation direction, at least two successively arranged main cutting elements, which both trail the leading clearance groove cutting element in the rotation direction. The groove depth generated by the clearance groove cutting element can preferably already correspond to the nominal size, or as an alternative, may be smaller than the nominal size by an overmeasure. A first element of the afore-mentioned two main cutting elements may strip already to the nominal size, and a second element may remove surface material by an overmeasure that is smaller than the nominal size.

It is preferred, however, when the clearance groove cutting element already produces a groove depth which corresponds to the nominal size. In this way, the main cutting element can dispense entirely with a peripheral cutter, which otherwise would have to strip the remaining overmeasure.

Preferably, the active face cutter length of the clearance groove cutting element is sized during the milling process substantially smaller than the face cutter length of the trailing main cutting element. In this way, the clearance groove cutting element, in particular its main function, can be less subjected to milling stress, i.e. the creation of a clear free space, in which the radially outer cutting edge corner of the trailing main cutting element can move unencumbered.

The advantageous configurations and/or refinements of the invention, discussed above and/or set forth in the dependent claims, can be used individually or also in any combination with one another—except, for example, in cases of unambiguous dependencies or incompatible alternatives.

BRIEF DESCRIPTION OF THE DRAWING

The invention and its advantageous configurations and refinements as well as its advantages are explained in more detail with reference to the drawings.

It is shown in.

DETAILED DESCRIPTION OF PREFERRED EMBODIMENTS

Figure 6:
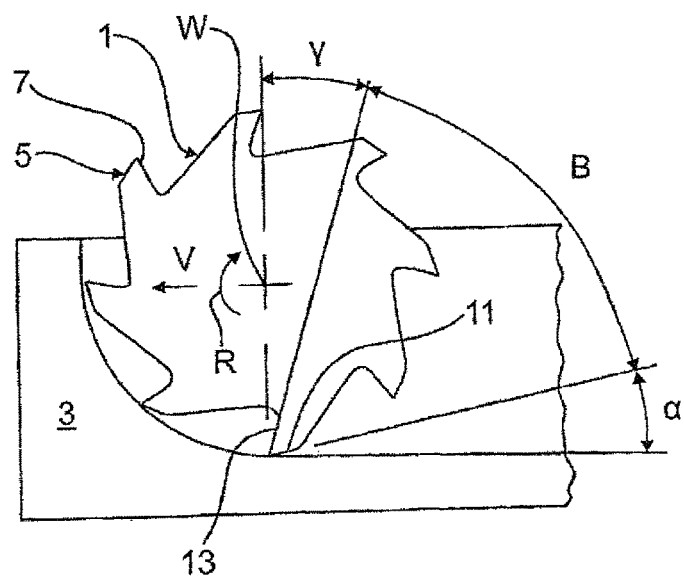
FIG. 6 a view from above to illustrate a face milling process known in the art.

For ease of understanding, a conventional face milling process (i.e., peripheral face milling) is first described with reference to FIG. 6, which forms the starting point of the invention. In the face milling process shown in FIG. 6, a milling tool 1 is used, having a tool axis W which is oriented perpendicular to a workpiece surface 3 to be machined. The milling tool 1 has a number of cutting elements 5 which are evenly distributed about the circumference. The cutting elements have an outer periphery provided with peripheral cutters 7 and face cutters (not shown in FIG. 1) provided on an end face of the milling tool 1 and facing the tool surface. The milling tool 1 removes material exclusively with the peripheral cutters 7, whereas the face cutters smoothly strip only the machined workpiece surface. 9 In the illustrated milling operation, the milling tool 1 is driven at a rotation movement R about the tool axis W. In addition, the milling tool 1 is driven transversely to the tool axis W and along the workpiece surface 3 at a feed movement V.

In terms of the cutting elements 5, a distinction is typically made between a clearance angle α, a wedge angle β, and a rake angle γ. The clearance angle α is spanned in FIG. 6 between a cutter backside 11 and an imaginary circle line, along which the peripheral cutters 7 move. The wedge angle β is spanned between a cutter front side 13 and the cutter backside 11. The rake angle γ is spanned between a radius line, on which the peripheral cutter 7 lies, and the cutter front side 13. In terms of dimensioning the feed rate, the clearance angle α is, i.a., of importance. In order to increase the feed rate, the clearance angle α is to be increased correspondingly. However, this is accompanied by a respective reduction of the wedge angle β of the cutting elements 5, thereby increasing the risk of premature wear and tool breakage at the peripheral cutters 7.

Figure 1:
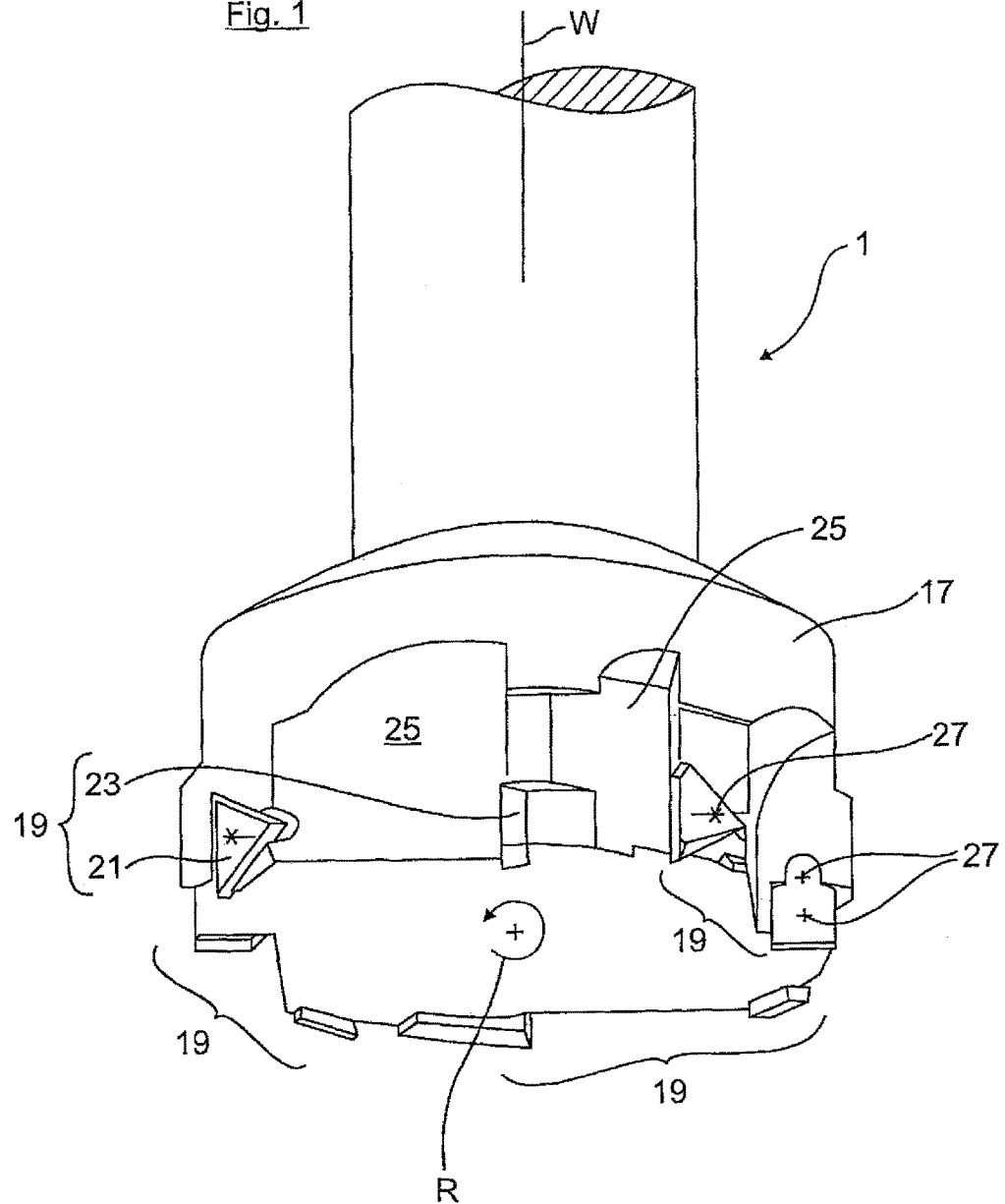
FIG. 1 a perspective illustration of a milling tool for face milling.
Figure 2:
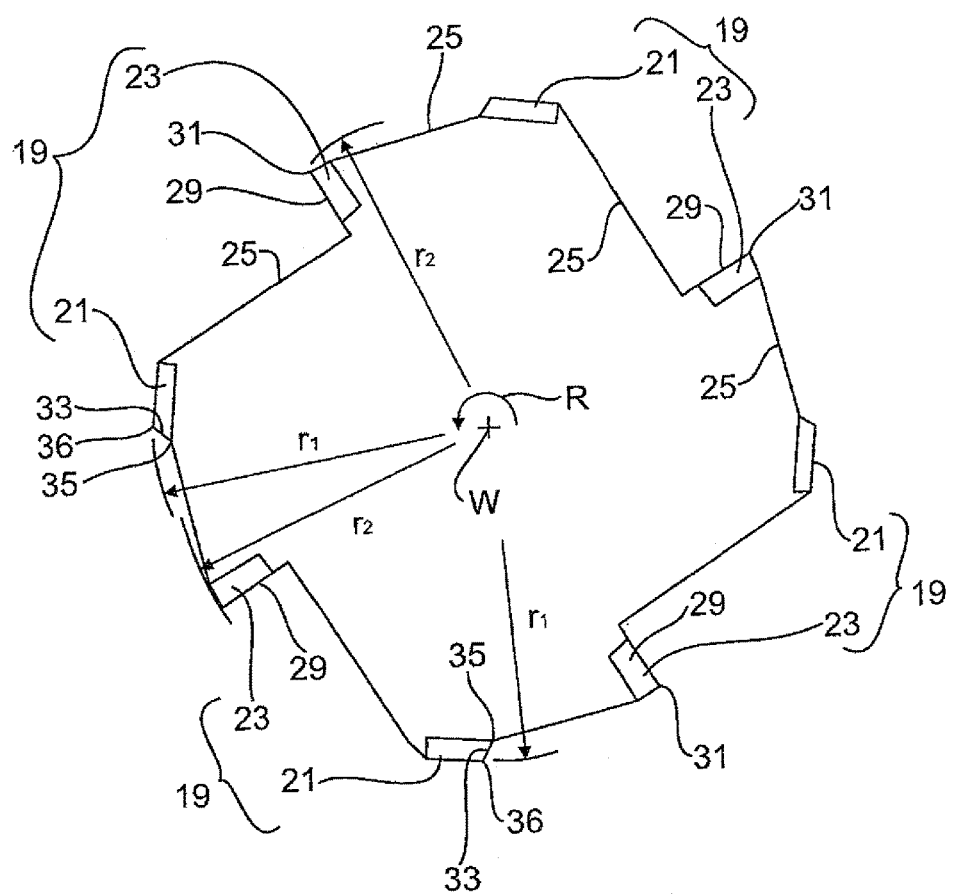
FIG. 2 the end face of the milling tool in confronting relation a tool surface.
Figure 3:
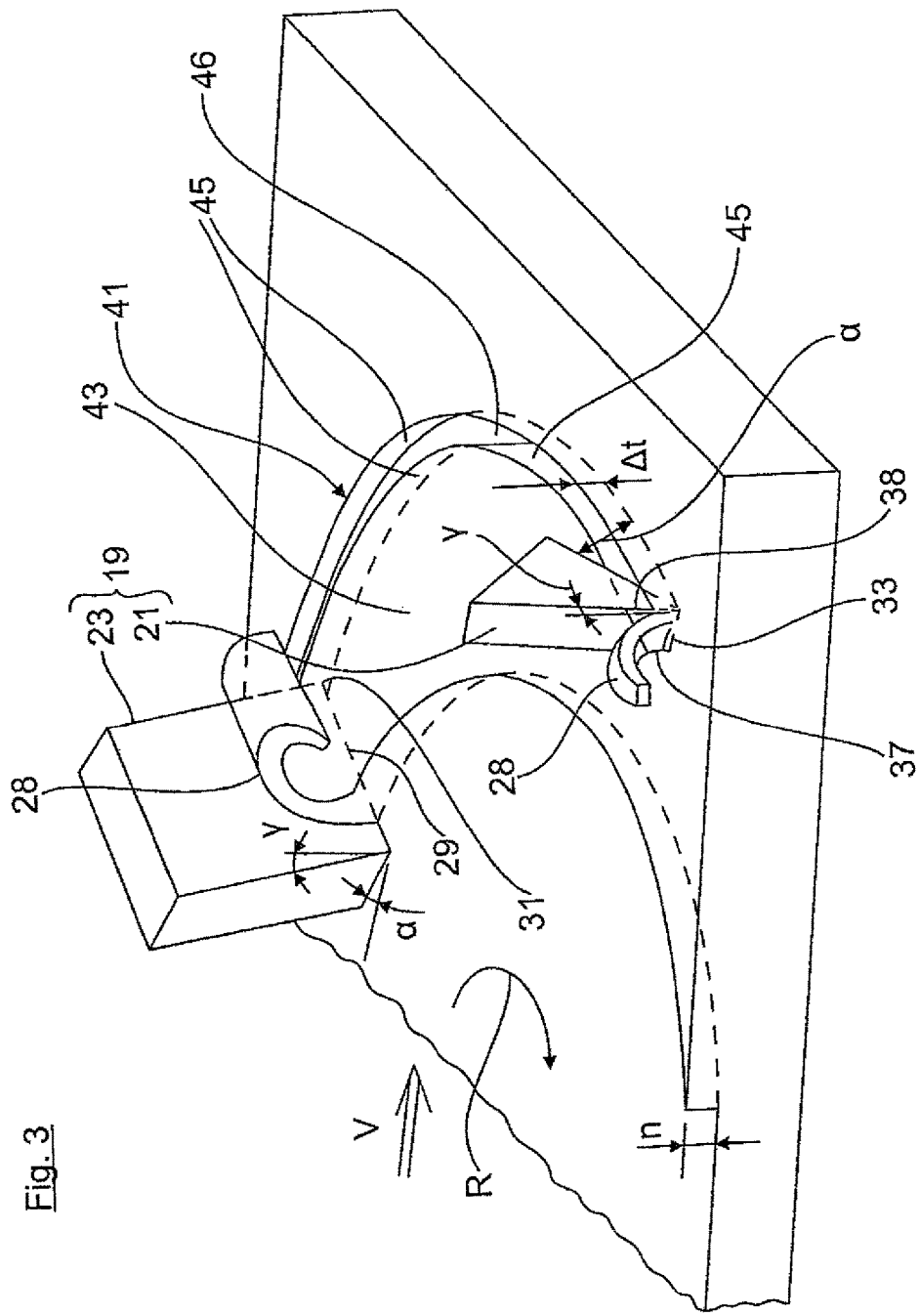
FIG. 3 a rough schematic perspective illustration of the milling process according to the invention.

In contrast thereto, the invention shown in FIGS. 1 to 4 pursues with the assistance of the milling tool 1, shown in FIG. 1, an alternative approach to increase the feed rate. Accordingly, the milling tool 1 includes, according to FIG. 1, a base body 17 which is rotatable about the tool axis W. A total of four cutter sets 19 are provided on the end face of the base body 17 and evenly distributed about the circumference. Each of the cutter sets 19 has a clearance groove cutting element 21 that leads in the rotation direction R, and a main cutting element 23 that trails in the rotation direction R. Placed anteriorly of each of the two cutting elements 21, 23 is a chip chamber 25 to carry off produced chips 28 (FIG. 3). The face cutters 29, 33 (FIG. 3) of the main cutting element 23 and of the clearance groove cutting elements 21 are, according to FIG. 3, at an incline about a rake angle γ in opposition to the rotation direction R so that the chips 28 are not stripped circumferentially outwards but rather upwards. In addition, the clearance groove cutting elements 21 and the main cutting elements 23 are secured to the base body 17 as separate replacement parts by indicated clamping screws 27.

Figure 4:
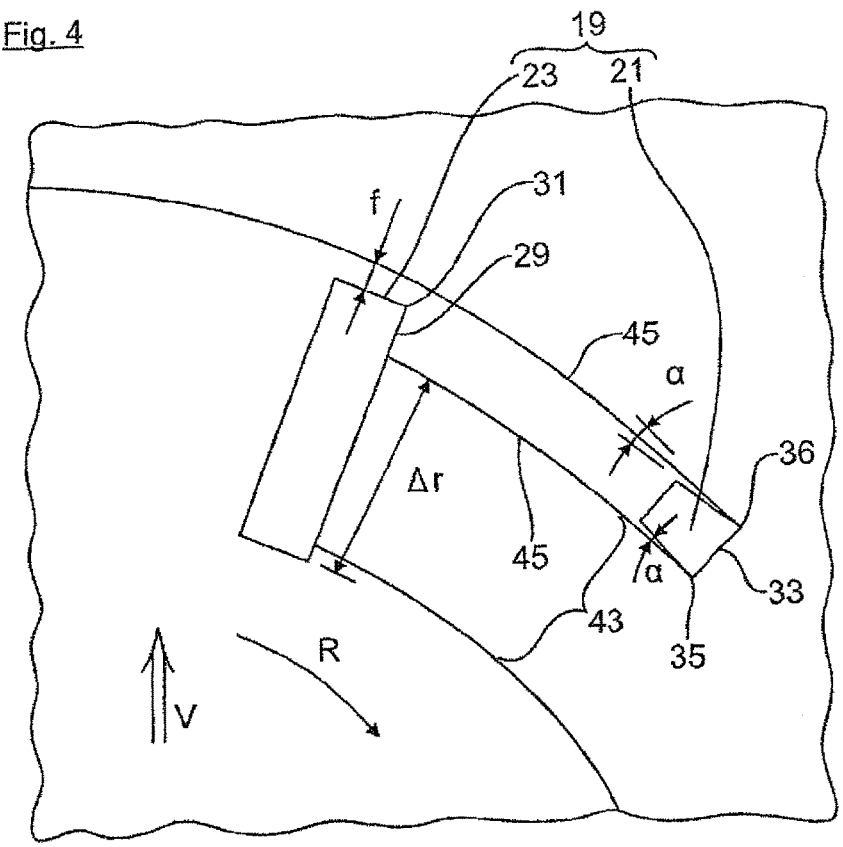
FIG. 4 a schematic partial view from above to show a cutter set comprised of a main cutting element and a clearance groove cutting element during a milling process.

According to FIGS. 2, 3, and 4, each of the main cutting elements 23 has a face cutter 29, which extends, according to FIG. 2, up to a radially outer cutting edge corner 31. With the assistance of the face cutter 29 of the respective main cutting element 23, material is removed from the workpiece surface 3 by a nominal size n (FIG. 3) The clearance groove cutting element 21, leading in the rotation direction R, has also a face cutter 33 (FIG. 3). The face cutter 33 of the respective clearance groove cutting element 21 respectively transitions at the radially inner and outer cutting edge corners 35, 36 (FIG. 3) into radially inner and radially outer peripheral cutters 37, 38. The two peripheral cutters 37, 38 are provided with clearance angles α in FIG. 4. FIG. 2 shows, by way of example, that the radially outer cutting edge corner 36 of the leading clearance groove cutting element 21 lies on a radius $r_1$, which, by way of example, is greater here than the radius $r_2$ on which the radially outer cutting edge corner 31 of the trailing main cutting element 23 lies.

In addition, the respective main cutting element 23 extends radially inwards beyond the respective clearance groove cutting element 21 by an overhang Δr (FIG. 4).

FIGS. 3 and 4 indicate the face milling process that can be executed with the milling tool 1 according to the invention. For sake of clarity, FIGS. 3 and 4 show only the milling tool by way of a single cutter set 19, comprised of a main cutting element 23 and a clearance groove cutting element 21, in the absence of the base body 17 of the milling tool. Accordingly, the leading clearance groove cutting element 21 produces a clearance groove 41 having, according to FIG. 3, a groove base 46 as well as laterally upwardly extending groove walls 45. Chips removed hereby are transported upwards via the chip chambers 25 shown in FIG. 1. The clearance groove 41 is made with the assistance of the face cutter 33 and the two inner/outer peripheral cutters 37, 38 of the clearance groove cutting element 21. The groove depth Δt (FIG. 3) thus produced may, for example, be identical with the nominal size n (FIG. 3) to be stripped from the workpiece surface 3. According to FIG. 3, a material web 43 remains radially inside of the clearance groove 41 and is stripped by the training main cutting element 23, specifically up to the afore-mentioned nominal size n.

The radially outer cutting edge corner 31 of the main cutting element 23 does not—as opposed to the clearance groove cutting element 21—transition into an additional peripheral cutter. Rather, the face cutter 29 of the respective main cutting element 23 ends at the radially outer cutting edge corner 31, that is in the absence of such a peripheral cutter. The radially outer cutting edge corner 31 of the main cutting element 23 is, according to FIG. 4, distanced by a clear free space f from the radially outer groove sidewall 45 and thus is guided in the clearance groove 41 substantially without being subjected to cutting stress. According to the invention, the feed rate can thus be increased, without any risk or premature wear or breakage of the main cutting element 23 at the outer cutting edge corner 31.

The invention is not limited to the illustrated exemplary embodiment. Rather, the cutter set 19 may have not only a single main cutting element 23, but, viewed in the rotation direction R, at least two successively arranged main cutting elements 23, which both trail the leading clearance groove cutting element 21 in the rotation direction R. The groove depth Δt generated by the clearance groove cutting element 21 can preferably already correspond to the nominal size n or alternatively be smaller by an overmeasure than the nominal size n. By way of example, a first element of the afore-mentioned two main cutting elements 23 can remove surface material up to the nominal size n, and a second element can strip by an overmeasure smaller than the nominal size.

Figure 5:
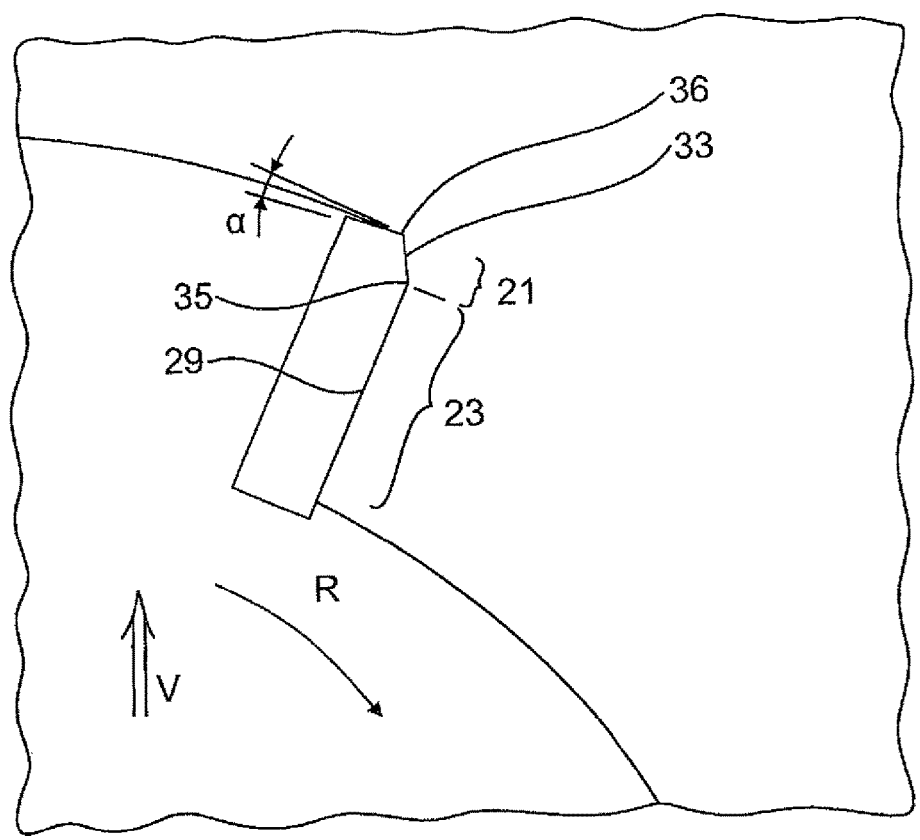
FIG. 5 a further exemplary embodiment by way of a view corresponding to FIG. 4.

FIGS. 1 to 4 relate to a preferred exemplary embodiment, in which the main cutting element 23 and the clearance groove cutting element 21 are two separate structural components. The invention is, however, not limited to this exemplary embodiment. Rather, the main cutting element 23 and the clearance groove cutting element 21 may be integrated in a common cutting element, as shown in FIG. 5. In FIG. 5, the face cutter 29 of the main cutting element 23 transitions at the cutting edge corner 35 directly into the face cutter 33 of the clearance groove cutting element 21 which is at an incline in counterclockwise direction. Adjoining the face cutter 33 of the clearance groove cutting element 21 is then radially outwards a clearance angle α.

It is furthermore to note that the number of main cutting elements 23 and of the clearance groove cutting elements 21 is freely selectable. Any number of clearance groove cutting elements 21 may be placed anteriorly of the at least one main cutting element 23. In this case, the clearance groove 41 is produced not by one but several clearance groove cutting elements 21. Conversely, any number of main cutting elements 23 may be placed behind the at least one clearance groove cutting element 21.

The invention claimed is:

1. A milling tool for face milling a substantially flat workpiece surface, said milling tool rotatable in a rotation direction about a tool axis oriented at a right angle to the workpiece surface and movable transversely to the tool axis and along the workpiece surface, said milling tool comprising:
a leading clearance groove cutting element comprising a face cutter having a face cutting edge and radially inner and outer peripheral cutting edges, with a spacing between the radially inner and outer peripheral cutting edges defining a width of the at least one leading clearance groove cutting element and hence a width of a clearance groove to be cut in the workpiece surface, and
at least one trailing main cutting element comprising a face cutter having a face cutting edge and a radially outer cutting edge corner, but lacking an outer peripheral cutting edge, and having a width greater than the width of the at least one clearance groove cutting element,
wherein, due to absence of outer peripheral cutting edge in the at least one trailing main cutting element, the radially outer cutting edge corner of the main cutting element is guided in the clearance groove without being subjected to cutting stress.

2. The milling tool of claim 1, wherein the main cutting element and the clearance groove cutting element are two components separate from each other.

3. The milling tool of claim 1, wherein the main cutting element and the clearance groove cutting element are integrated in a common cutting element.

4. The milling tool of claim 1, wherein the radially outer cutting edge corner of the main cutting element is distanced by a clear free space from a radially outer groove sidewall of the clearance groove.

5. The milling tool of claim 1, wherein the main cutting element extends by an overhang radially inwards beyond the inner peripheral cutting edge of the clearance groove cutting element.

6. The milling tool of claim 1, wherein the main cutting element is configured to remove a material web, remaining radially inwards in the workpiece surface of the clearance groove after producing the clearance groove.

7. The milling tool of claim 1, wherein the face cutter of the clearance groove cutting element and the face cutter of the main cutting element are arranged at an incline by a rake angle in opposition to the rotation direction.

8. The milling tool of claim 1, further comprising at least two main cutting elements arranged in succession in the rotation direction and trailing the leading clearance groove cutting element in the rotation direction.

9. The milling tool of claim 8, wherein a first element of the at least two main cutting elements, when viewed in the rotation direction, is configured to remove material to a depth that is smaller than the nominal groove depth by an allowance, and a second element of the at least two main cutting elements removes material to the nominal groove depth.

10. The milling tool of claim 1, wherein a groove depth of the clearance groove has a nominal groove depth or is smaller than the nominal groove depth by an allowance.

11. The milling tool of claim 1, wherein the at least one main cutting element and the clearance groove cutting element form a cutter set, further comprising a plurality of said cutter sets circumferentially distributed on an end face of the milling tool.

12. A method for face milling a substantially flat workpiece surface with a milling tool rotatable in a rotation direction about a tool axis at a right angle to the workpiece surface and movable transversely to the tool axis and along the workpiece surface, said method comprising:

cutting in the workpiece surface in the rotation direction a clearance groove by a leading clearance groove cutting element which comprises a face cutter having a face cutting edge and radially inner and outer peripheral cutting edges, wherein a spacing between the radially inner and outer peripheral cutting edges defines a width of the at least one leading clearance groove cutting element and hence a width of a clearance groove to be cut in the workpiece surface, removing in the workpiece surface with trailing main cutting element comprising a face cutter having a face cutting edge and a radially outer cutting edge corner, but lacking an outer peripheral cutting edge, in the rotation direction material to a depth corresponding at most to a depth of the clearance groove, wherein a width of the removed material is greater than the width of the clearance groove, and wherein a radially outer cutting edge corner of the main cutting element is guided in the clearance groove substantially without being subjected to cutting stress.

* * * * *